Nov. 14, 1961   B. W. PERKINS, JR., ET AL   3,008,347
VARIABLE STROKE CRANKSHAFT CONSTRUCTION
Filed April 4, 1960   2 Sheets-Sheet 1

INVENTORS
BERTRAM WEBSTER PERKINS, JR.
DANIEL W. MARSH

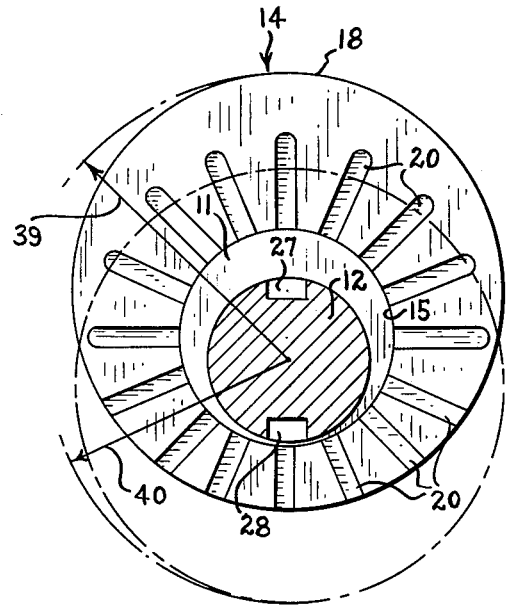
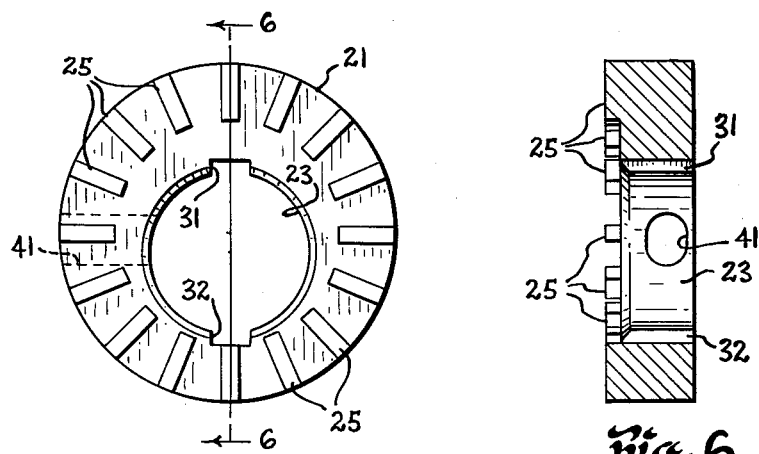

3,008,347
VARIABLE STROKE CRANKSHAFT CONSTRUCTION

Bertram Webster Perkins, Jr., and Daniel W. Marsh, Warren, Mass., assignors to Perkins Machine Company, Warren, Mass., a corporation of Maine
Filed Apr. 4, 1960, Ser. No. 19,579
8 Claims. (Cl. 74—571)

This invention relates to improvements in variable stroke crankshaft constructions and has particular reference to the provision of a novel adjustable crankshaft wherein the adjustments thereof may be made in a relatively simple, convenient and positive manner.

One of the principal objects of the invention is to provide a variable stroke crankshaft arrangement adapted particularly for use with high speed presses or the like wherein the stroke of the press may be varied by positive fixed increments and to required minimum lengths in a simple, convenient and efficient manner.

Another object is to provide a variable stroke crankshaft construction embodying a main cam member having an eccentric opening therein rotatably mounted on an integral eccentric portion on said crankshaft and having slots in the opposed sides thereof disposed radially with respect to the center of said eccentric opening and which may be rotatably adjustably interfitted with radial teeth formed on the inner side surfaces of spaced cam lock members keyed to said crankshaft and held in clamping relation with the opposed sides of said main cam member by lock nuts threaded onto threaded portions formed on said crankshaft at locations slightly outwardly of said cam lock members.

Another object is to provide a main cam member for use with cam lock members of the above nature and which may be adjusted to vary its stroke by fixed increments of adjustments by loosening the lock nuts an amount sufficient to enable the teeth of the cam lock members to be withdrawn sidewise from the radial slots in the main cam member whereby said main cam member may be rotated different controlled amounts in accordance with the extent of stroke desired and may then be locked in said adjusted position by again fitting the teeth of the cam lock members within the aligned radial slots and by again tightening the lock nuts.

Other objects and advantages of the invention will become apparent from the following description taken in conjunction with the accompanying drawings wherein FIG. 1 is a side elevational view of the device embodying the invention showing, in cross section, associated parts with which it may be used;

FIG. 4 is a fragmentary sectional view taken as on line 4—4 of FIG. 1 and showing in full lines the position of the main cam for maximum stroke and in dot and dash lines the position of the main cam for minimum stroke and with arrows indicating the radii of movement of said main cam to obtain said strokes;

FIG. 5 is an inner face view of one of the cam lock members of the device embodying the invention; and FIG. 6 is a sectional view taken as on line 6—6 of FIG. 5 and looking in the direction indicated by the arrows.

Figure 1:
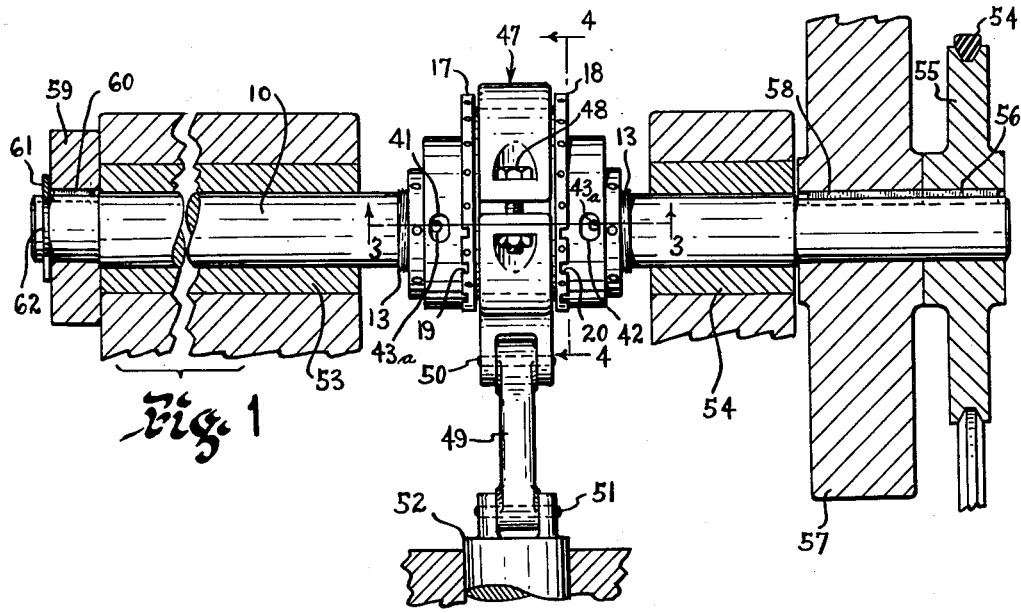
Figure 2:
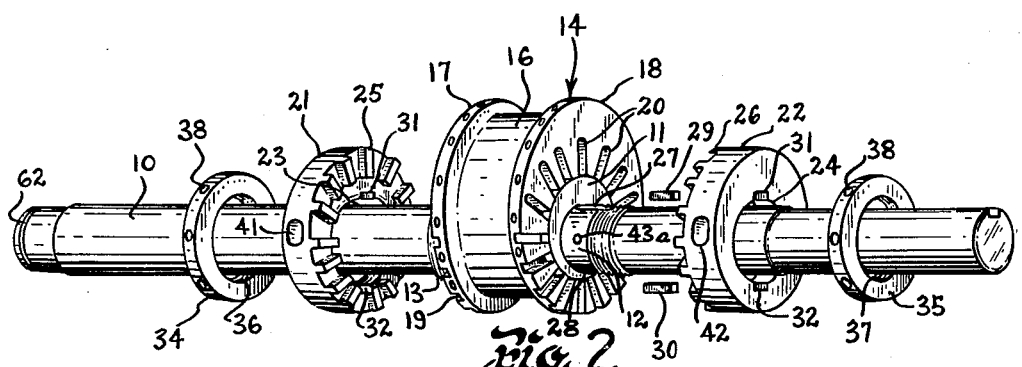
FIG. 2 is an exploded perspective view of the crankshaft construction shown in FIG. 1 and showing particularly the parts embodying the present invention.
Figure 3:
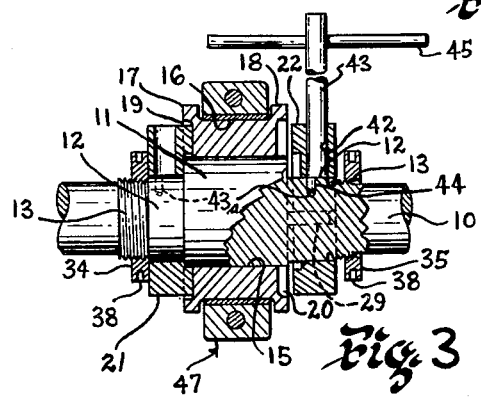
FIG. 3 is a fragmentary sectional view taken as on line 3—3 of FIG. 1 and looking in the direction indicated by the arrows and illustrating one of the parts thereof in disengaged position and the means for bringing about said disengagement.

Referring to the drawings wherein like characters of reference designate like parts throughout the various views, the device embodying the invention comprises a crankshaft 10 having an intermediate integral eccentric portion 11 and having integral bearing portions 12 on the opposite sides of said integral eccentric portion 11 and further having threaded sections 13 adjacent the outer side of each of the bearing portions 12. A main cam member 14 having an eccentric opening 15 therein is rotatably mounted on the integral eccentric portion 11 and has an outer bearing surface 16 and integral side flange portions 17 and 18 on the opposed sides of said bearing surface 16. The said main cam member is provided in the opposed outer side surfaces thereof with a plurality of spaced slots 19 and 20 which are radially disposed with respect to the center of said eccentric opening 15.

A pair of cam lock members 21 and 22 having eccentric openings 23 and 24 therein are dimensioned to intimately fit the respective bearing portions 12 and 13 on the opposed sides of the eccentric portion 11 and are adapted to engage the opposite sides of the main cam member 14. The cam lock members 21 and 22 are each provided on the inner side surfaces thereof with a plurality of spaced teeth 25 and 26 radially disposed with respect to the axis of the eccentric portion 11 when positioned on said respective bearing portions 12 and are in keyed relation with said portions. The said radial teeth must be equally spaced relative to each other and such as to align with certain of the radial slots at different positions of rotation of the main cam member. The spacing of said slots determines the increments of adjustment and are adapted to be fitted with the radial teeth at said different adjusted positions. The bearing portions 12 are each provided with diametrically opposed key slots 27 and 28 which are adapted to receive suitable key members 29 and 30. The said key members are adapted to fit within diametrically opposed key slots 31 and 32 formed in said cam lock members and which thereby bring about the above-mentioned keyed relation of said cam lock members with said bearing portions 12.

It is to be understood that the key members 29 and 30 and the slots 31 and 32 are so dimensioned as to permit each of said cam lock members 21 and 22 to be slid on said key members and yet be rigidly held against rotation with respect to said bearing portions 12.

A pair of lock nuts 34 and 35 having internally threaded bores 36 and 37 are adapted to be threaded onto said respective threaded portions 13 so as to clampingly hold the respective cam lock members with their teeth in assembled relation with the radial slots in the opposed sides of the main cam member. A plurality of openings 38 are formed in circumferentially spaced relation with each other in the periphery of said lock nuts so as to permit said nuts to be tightened or loosened by a suitable spanner wrench or the like.

The adjustment of the main cam member in order to obtain the maximum throw of stroke, as illustrated by the arrow 39 and minimum throw of stroke as illustrated by the arrow 40 in FIG. 4, is accomplished by loosening the respective lock nuts 34 and 35 by an amount sufficient to permit the radial teeth 25 and 26 of the cam lock members 21 and 22 to be moved sidewise outwardly of the respective radial slots 19 and 20 in said main cam member. This moving of the cam lock members in a direction sidewise away from the main cam member is accomplished through the provision of openings 41 and 42 in the peripheral portions of the cam lock members and through the use of a cam lock wrench embodying a main bar portion 43 extending through said respective openings 41 or 42 as the case may be and having an eccentric reduced protrusion 44 on the lower end thereof adapted to be positioned in a respective opening 43a formed in the crankshaft 10. Upon rotation of said main bar portion by engaging a handle portion 45 provided thereon will cause the side surface 46 of said main bar portion 43 to engage the adjacent side of the respective opening 41 or 42 of cam lock member and thereby cause it to be forced or slid in a sidewise direction away from said main cam member and disengage the teeth thereof from the radial slots in the adjacent side of said main cam member.

This will permit the main cam member to be rotated on the eccentric cam portion 11 an amount to obtain the throw or stroke desired. The adjustment is such as to position the respective slots 19 and 20 in alignment with the radial teeth 25 and 26 of the respective cam lock members 21 and 22 at said location whereupon the said cam lock members 21 and 22 are again moved inwardly to position their radial teeth within said radial slots 19 and 20 and are locked in said position by again tightening the respective lock nuts 34 and 35.

It is stated here that the slots 19 and 20 may be provided in the cam lock members instead of in the main cam member in which instance the teeth would be provided on the side surfaces of the main cam member 14.

Mounted on the bearing surface 16 of the main cam member may be a conventional split collar 47 having its divided portions connected by suitable bolts or the like 48 whereby the said collar may be placed in surrounding relation with said bearing surface 16. The collar 47 is pivotally connected to a connecting rod 49, as shown at 50, which in turn may be pivotally connected at 51 to the ram 52 of a conventional high speed press or the like. The crankshaft 10 is mounted in suitable spaced bearings 53 and 54 in a conventional manner and is adapted to be rotated by a belt and pulley drive 54 and 55 of conventional type or may be driven by other suitable drive means keyed to said crankshaft by a suitable key 56.

The crankshaft may have a fly wheel 57 keyed thereto by a key member 58 of the conventional type. The opposed end of the crankshaft is provided with a suitable collar 59 keyed thereto by a key 60 and held thereon by a clamp ring or the like 61 fitting within a suitable circumferential groove 62 formed in said shaft. This is to prevent end thrust of said crankshaft in said bearings during the rotation thereof.

It is to be understood that means other than the collar 59 might be attached to said end of the crankshaft if desired.

While the invention has been described as being applied to high speed presses or the like, it is to be understood that it may be utilized with various different devices which require a variable stroke crankshaft construction.

From the foregoing description it will be seen that simple, efficient and economical means has been provided for accomplishing all of the objects and advantages of the invention, and it is to be understood that the details of construction and arrangements of parts may be varied without departing from the spirit of the invention as defined in the appending claims as the details of construction and arrangement of parts is set forth only by way of illustration.

Having described our invention, we claim:

1. A device of the character described comprising a crankshaft having only a single intermediate integral eccentric portion thereon, a single main cam member having an eccentric opening therein rotatably mounted on said eccentric portion of the crankshaft and extending throughout the major portion of the width thereof, means having openings therein concentric with the axis of said crankshaft and having an eccentric portion concentric with the axis of the intermediate eccentric portion of the crankshaft fitted on and keyed directly to said shaft adapted to engage directly with the opposite sides of said main cam member, one of said means and said main cam member having interengaging means thereon and means for retaining said interengaging means in direct interconnected relation with each other.

2. A variable stroke crankshaft construction comprising a crankshaft having only a single intermediate intergral eccentric portion thereon, a single main circular cam member having an eccentric opening therein rotatably mounted on said eccentric portion of the crankshaft and extending throughout the major portion of the width thereof, cam lock members having eccentric openings therein concentric with the axis of said crankshaft and keyed directly to said crankshaft on the opposed sides of said main cam member, said cam lock members having side surfaces engaging directly with the respective side surfaces of the main cam member, the side surface of one of said cam lock members and the adjacent side surface of the main cam member having interfitting teeth and grooves therein and means for locking said cam lock members in direct engaging relation with said main cam member.

3. A variable stroke crankshaft construction comprising a crankshaft having only a single intermediate eccentric portion thereon, a main circular cam member having an eccentric opening therein rotatably mounted on said eccentric portion of the crankshaft and extending throughout the major portion of the width thereof, cam lock members having eccentric openings therein concentric with the axis of said crankshaft and keyed directly to said crankshaft on the opposed sides of said main cam member, said cam lock members having side surfaces directly engaging the respective side surfaces of the main cam member, the side surface of one of said cam lock members and the adjacent side surface of the main cam member having interfitting teeth and grooves therein and means directly engaging said cam lock members for locking said cam lock members in engaging relation with said main cam member, one of said means being capable of being loosened to enable the interfitting teeth and grooves to be disengaged to permit the main cam member to be rotatably adjusted relative to said eccentric portion of the crankshaft and thereafter tightened to again interengage the teeth and grooves to retain said adjustment.

4. A variable stroke crankshaft construction comprising a crankshaft having only a single intermediate eccentric portion thereon, a single main circular cam member having an eccentric opening therein and having grooves in the opposite side surfaces thereof radially disposed with respect to the center of the opening therein, said main cam member being rotatably mounted on said eccentric portion of the crankshaft, cam lock members having eccentric openings therein in concentric relation with the axis of the crankshaft and keyed directly to said crankshaft on the opposite sides of said main cam member, said cam lock members having side surfaces directly engaging the respective side surfaces of the main cam member and having teeth radially disposed with respect to the centers of the eccentric openings therein and adapted to interengage with the radial grooves in the main cam member and means directly engaging said cam lock members for locking said cam lock members in engaging relation with said main cam member.

5. A device of the character described comprising a crankshaft having only a single intermediate integral eccentric portion and bearing portions on the opposite sides thereof coaxial with the axis of said crankshaft and further having threaded sections adjacent the outer sides of each of said bearing portions coaxial with the axis of said crankshaft, a single main cam member having an eccentric opening therein rotatably mounted on said eccentric portion of the crankshaft, said main cam member having slots in a side surface thereof radially disposed with respect to the center of said eccentric opening therein, cam lock members having eccentric openings therein on said bearing portions in coaxial relation with the axis of said shaft and keyed directly to said bearing portions and adapted to directly engage the opposite sides of said main cam member, one of said cam lock members having teeth radially disposed with respect to the center of the eccentric opening therein and adapted to interfit with the radial slots in the adjacent surface of said main cam member and lock nuts each having a threaded bore therein threadedly connected with said threaded portions of the crankshaft and adapted to retain said cam lock members in direct engaging relation with the main cam member and to retain the teeth on one of said cam lock members in engaging relation with the slots in the main cam member.

6. A device of the character described comprising a crankshaft having only a single intermediate integral eccentric portion and having integral bearing portions on the opposed sides of said eccentric portion in coaxial relation with the axis of said crankshaft and further having threaded sections adjacent the outer side of each of said bearing portions in coaxial relation with the axis of said crankshaft, a single main cam member having an eccentric opening therein rotatably mounted on the integral eccentric portion of the crankshaft, cam lock members having eccentric openings therein keyed directly on said bearing portions on the opposed sides of said main cam member and having the axes of their openings in coaxial relation with the axis of said crankshaft, one of the adjacent side surfaces of said main cam and one of said cam lock members having slots therein radially disposed with the axis of the opening therein and the other of said members having teeth radially disposed with respect to the axis of the opening therein and adapted to be positioned in said radial slots, means for keying said cam lock members directly to said bearing portions so as to permit said cam lock members to move in a sidewise direction with respect to the opposed sides of said main cam member and lock nut means having threaded bores threadedly connected with the respective threaded portions of said crankshaft for directly engaging and locking said cam lock members in direct engagement with said main cam member with the respective teeth and grooves in interfitting relation with each other.

7. A device of the character described comprising a crankshaft having only a single intermediate eccentric portion and bearing portions on the opposite sides thereof and further having threaded sections adjacent the outer sides of each of said bearing portions, said bearing portions and said threaded sections being coaxial with the axis of the crankshaft, a single main cam member having an eccentric opening therein rotatably mounted on said eccentric portion of the crankshaft, said main cam member having slots in a side surface thereof radially disposed with respect to the center of said eccentric opening therein, cam lock members having eccentric openings therein on said bearing portions and keyed directly to said bearing portions and adapted to directly engage the opposite sides of said main cam member, said openings in said cam lock members being in coaxial relation with the axis of said crankshaft, one of said cam lock members having teeth radially disposed with respect to the center of the eccentric opening therein and adapted to interfit with the radial slots in the adjacent surface of said main cam member and lock nuts each having a threaded bore therein threadedly connected with said threaded portions of the crankshaft and adapted to directly engage and retain said cam lock members in engaging relation with the main cam member and to retain the teeth on one of said cam lock members in engaging relation with the slots in the main cam member, said lock nuts each having spaced radially disposed peripheral openings therein in which suitable projecting portions of a spanner wrench may be positioned to loosen or tighten said nuts.

8. A device of the character described comprising a crankshaft having only a single intermediate integral eccentric portion and bearing portions on the opposite sides thereof and further having threaded sections adjacent the outer sides of each of said bearing portions, said bearing portions and said threaded sections being coaxial with the axis of the crankshaft, a single main cam member having an eccentric opening therein rotatably mounted on said eccentric portion of the crankshaft and being of a width substantially equal to the width of said eccentric portion, said main cam member having slots in a side surface thereof radially disposed with respect to the center of said eccentric opening therein, cam lock members having eccentric openings therein on said bearing portions and keyed directly to said bearing portions in such manner as to permit them to be moved into direct engagement with the opposite sides of said main cam member, said openings in said cam lock members being in coaxial relation with the axis of the crankshaft, one of said cam lock members having teeth radially disposed with respect to the center of the eccentric opening therein and adapted to interfit with the radial slots in the adjacent surface of said main cam member, lock nuts each having a threaded bore therein threadedly connected with said threaded portions of the crankshaft and adapted to directly engage and retain said cam lock members in engaging relation with the main cam member and to retain the teeth on one of said cam lock members in engaging relation with the slots in the main cam member, said lock nuts each having spaced radially disposed peripheral openings therein in which suitable projecting portions of a spanner wrench may be positioned to loosen or tighten said nuts, and said cam lock members each having a radial opening extending therethrough in respective offset communicating relation with adjacent eccentrically related openings in the crankshaft and adapted to receive a tool having a portion which may be fitted into said radial openings and further having an offset projection which may simultaneously be fitted in the eccentrically related openings in the crankshaft and which upon rotation thereof, when the adjacent lock nut is sufficiently loosened, will move the respective cam lock member in which it is positioned in a sidewise direction to disengage the teeth thereof from the radial slots in the main cam member to permit rotatable adjustment thereof relative to the eccentric portion of the crankshaft.

References Cited in the file of this patent

UNITED STATES PATENTS

| | | |
|---|---|---|
| 2,541,573 | Conner | Feb. 13, 1951 |
| 2,547,197 | Conner | Apr. 3, 1951 |